United States Patent Office 3,756,927 Patented Sept. 4, 1973

3,756,927

MAGNETIC PLATING SOLUTION FOR NDRO MEMORY WIRE

Emil Toledo, Natick, Mass., assignor to Raytheon Company, Lexington, Mass.

No Drawing. Continuation-in-part of abandoned application Ser. No. 882,332, Dec. 4, 1969. This application Oct. 27, 1971, Ser. No. 193,202
Int. Cl. C23b 5/32
U.S. Cl. 204—43 T 6 Claims

ABSTRACT OF THE DISCLOSURE

An aqueous electrolyte for plating NDRO memory wire having consisting magnetic properties along its length, said electrolyte comprising nickel sulfate and nickel chloride in a concentration ratio of at least two to one, cobalt and saccharin in a concentration ratio of about ten to one and a ferrous compound having a complex anion, such as ferrous ammonium sulfate, for example.

BACKGROUND OF THE INVENTION

This application is a continuation-in-part of application Ser. No. 882,332, filed Dec. 4, 1969, now abandoned. The invention described herein was made in the course of or under a contract with the Department of Navy, Strategic Systems Projects Office.

This invention is related, generally to electrochemical baths for plating magnetic material and is concerned, more particularly, with an electrolytic solution for plating a nickel-iron-cobalt film on a conductive substrate.

Plated memory wire, generally, comprises a specially cleaned and prepared wire which is coated with magnetic material by means of an electroplating process. Usually, the wire is drawn longitudinally through an electroplating bath while connected as the cathode of the bath. As a result, magnetic material is electrodeposited from the electrolytic solution in the plating bath onto the cylindrical surface of the wire, thereby coating the wire with a continuous film of magnetic material.

The electrolyte of a typical magnetic plating bath, generally, includes nickel ions and ferrous ions in an aqueous solution with their associated anions. This type of electrolyte, usually, coats the wire with a thin film of Permalloy, a material comprising about 80 percent nickel and 20 percent iron. Permalloy is a preferred coating material for plating memory wire because it exhibits low magnetostrictive characteristics when the wire is distorted. Also, Permalloy film plated on a wire substrate acquires uniaxial, anisotropic magnetic properties when exposed to the flux of a coaxial magnetic field during the plating process. As a result, an easy direction of magnetization is established circumferentially in the plated Permalloy coating; and an orthogonal hard direction of magnetization is established longitudinally in the Permalloy film, parallel to the axial center line of the wire.

In the easy direction of magnetization, each discrete cylindrical portion of the Permalloy coating has a nearly square hysteresis loop; and in the hard direction, the hysteresis loop is nearly linear. Thus, any particular cylindrical portion of the Permalloy coated wire may be magnetized in the circumferential direction, either clockwise or counterclockwise. Furthermore, the magnetic vector of a selected portion of the Permalloy coating may be switched very rapidly from one circumferential rest position to the other. Consequently, these two oppositely directed rest positions of magnetization may be assigned the respective digits, one and zero of a binary logic system; and binary data may be stored in contiguous, cylindrical portions of the Permalloy coating.

Binary data is read out of a selected memory location in the Permalloy coating by rotating the magnetic vector thereof into the hard direction of magnetization and monitoring the resulting signal voltage induced in the coated memory wire. If the magnetic vectors of the respective memory cells return to their former rest positions after read-out, the Permalloy coated wire is commonly referred to as NDRO or Non-Destructive Read-Out wire.

Since contiguous, cylindrical portions of the plated Permalloy film serve as respective memory cells, it is imperative that the Permalloy coated wire exhibit consistent magnetic properties along its length. However, if stresses are induced in the Permalloy film during the plating process, localized variation will occur in the magnetic properties of the Permalloy coating. Consequently, various means have been devised for minimizing stress in the plated Permalloy film. For example, the iron constituent of Permalloy, preferably, is plated in its ductile form, since the other forms of plated iron have higher internal stresses. However, in order to plate ductile iron, the Permalloy plating bath must be maintained at a temperature of sixty degrees centigrade or higher, a temperature range where some Permalloy plating baths become unreliable. For example, the sulfamate nickel-iron baths, generally, are unsuitable for operating in the aforesaid temperature range because of the resulting instability of the ferrous anions. It has been found that the sulfamate ions tend to decompose and oxidize the ferrous ions, thereby forming ferric ions which interfere in the Permalloy plating process. As a result, inconsistencies occur in the plated Permalloy film which alter the magnetic properties of the Permalloy coating along the length of the wire.

The more recently developed sulfate nickel-iron baths are more stable than the sulfamate nickel-iron baths when plating the ductile iron type of Permalloy material. Since the sulfate ions are more complex, they tend to be more stable and do not decompose as readily as the sulfamate ions. However, the sulfate nickel-iron baths, usually, plate Permalloy films having coarse, columinar grain structures; and the resulting Permalloy coated wire, generally, exhibits erratic magnetic properties along its length. Testing discloses that the memory cells of the described Permalloy film do not have respective easy directions of magnetization uniformly oriented normal to the axial centerline of the wire and respective hard directions of magnetization parallel thereto. Actually, the respective easy directions of magnetization of the memory cells are skewed at slight angles to the desired normal direction; and the associated hard directions of magnetization are skewed correspondingly away from the desired parallel direction. If the aforesaid skew angles were uniform, it would be possible to correct or compensate for this type of constant deviation. However, test data indicates that the aforesaid skew angles vary randomly in angular distance from the desired direction. The distribution of skew angle is designated as the "dispersion characteristics, it indicates that the memory cells of the coated wire, usually, will not retain stored information after a few read-out operations. Consequently, a Permalloy coated wire which has been plated in a sulfate nickel-iron bath, generally, is not acceptable as NDRO plated memory wire.

The even more recently developed chloride nickel-iron baths plate a Permalloy film having a fine, laminar grain structure which exhibits good dispersion characteristics. However, the stresses induced in the plated Permalloy film are much higher than would be expected from a sulfate nickel-iron bath. As stated previously, these internal stresses in the plated Permalloy film cause localized variations in the magnetic properties of the resulting Permalloy coating. Consequently, a Permalloy coated wire which has been plated in a chloride nickel-iron bath, generally, does not exhibit consistent magnetic properties along its length, unless the internal stresses are reduced to an acceptable value. Saccharin, a standard stress reducing agent, frequently, is added to chloride nickel-iron baths for the purpose of reducing stresses in the plated Permalloy film and thereby counteracting the effect of the chloride ions. However, it has been found that saccharin degrades the magnetic properties of NDRO plated memory wire, a factor which is not encountered when plating DRO memory wire.

SUMMARY OF THE INVENTION

Accordingly, this invention provides an aqueous electrolyte for a magnetic plating bath which coats a wire substrate with a low stressed film of cobalt-Permalloy material having consistent magnetic NDRO properties along the length of the wire. The electrolyte comprises nickel sulfate and nickel chloride in a concentration ratio of at least two to one, cobalt and saccharin in a concentration ratio of about ten to one and a ferrous compound having a complex anion. The bath is maintained at a temperature greater than sixty degrees centigrade and a pH value less than three. Preferably, the total nickel concentration, from both the nickel sulfate and the nickel constituents is about 500 gm./liter; and the nickel sulfate to nickel chloride ratio is adjusted to about three to one. The concentration of iron is about .02 of the total nickel concentration and is adjusted for zero magneto-striction. The saccharin and cobalt constituents are balanced to obtain a nickel-iron-cobalt film having good dispersion properties and acceptable switching characteristics. Boric acid added as a pH buffer, and sodium lauryl sulfate as a wetting agent. Cobalt bromide is a preferred cobalt salt for use in the electrolyte of the present invention because test data indicates that the bromide ions improve dispersion and reduce stresses in the plated film similar to the saccharin constituent but without its accompanying disadvantage of degrading NDRO magnetic properties.

DESCRIPTION OF THE PREFERRED EMBODIMENT

Even though the bath of the present invention may be used in a number of electroplating processes, it is employed, specifically, for the purpose of producing NDRO plated memory wire. Consequently, it was evaluated in a typical magnetic plating line, where the wire substrate moved longitudinally through the magnetic plating bath at a rate determined by the operating speed of the line. Thus, discrete lengths of the wire surface were exposed to the action of this invention bath only during the brief interval of time required to traverse the length of the magnetic plating bath. Consequently, the electroplating bath of this invention was required not only to coat a continuous wire with a Permalloy film having the desired magnetic properties but also to accomplish this objective at a rate of speed compatible with the velocity of a magnetic plating line.

Typically, a magnetic plating line comprises a linear array of chemical cells in spaced, parallel relationship with one another. At one end of the line, a spool of wire, preferably beryllium-copper, is rotatably mounted in colinear, spaced relationship with the array of cells. In operation, wire feeds off the spool and is drawn longitudinally through the linear array of chemical cells. Generally, one of the cells in the array contains a pool of conductive liquid, such as mercury, for example, whereby electrical connections are made to the continuously moving wire. As the wire passes longitudinally through the linear array of cells, the surface of the wire is clean, polished and rinsed in the initial cells, copper plated in the intermediate cells and coated with magnetic material in one of the final cell stages of the magnetic plating line.

The electroplating solution of this invention was evaluated in the cell of the magnetic plating line wherein the wire substrate is coated with a magnetic material. The wire used during these evaluation tests was a commercial grade, No. 125, beryllium-copper wire having a diameter of approximately 5 mils and a surface finish of about sixteen microinches. Prior to magnetic plating, the wire substrate was cleaned, polished, rinsed and then copper plated in the cell stages of the magnetic plating line preceding the electroplating bath of this invention. The cell used for evaluating this inventive bath was 1.5 inches long and the associated plating line was operated at a velocity of about ten inches of plated memory wire per minute.

In the bath of this invention, the wire substrate was connected electrically as the cathode of the electroplating cell by means of the continuous wire passing through a pool of mercury in the final cell of the magnetic plating line. The anode of the magnetic plating cell was a cylinder of anode active material, such as pure nickel, for example, which was inserted in the input tube of the bath and connected directly to the appropriate terminal of an external voltage source. The flow rate of the inventive electrolyte through the magnetic plating cell was 1300 ml. per minute. The preferred composition and operating parameters of the eelctroplating bath of this invention are:

| | | |
|---|---|---|
| Nickel sulfate | gm./l. | 300–500 |
| Nickel chloride | gm./l. | 75–225 |
| Ferrous ammonium sulfate | gm./l. | 10–15 |
| Saccharin | gm./l. | .1–.6 |
| Cobalt nitrate | gm./l. | 1–6 |
| Boric acid | gm./l. | 20–80 |
| Sodium lauryl sulfate | mg./l. | 10–20 |
| Water | | Balance |
| pH | | 2–3 |
| Current density | amp./in.$^2$ | 2–3 |
| Operating temperature | ° C. | 50–69 |

The total concentration of nickel in the above electrolytic solution, both from the nickel sulfate and the nickel chloride constituents, preferably is about 500 m./liter. If the total concentration of nickel is much higher than the aforesaid optimum value, excess nickel tends to precipitate out of the solution; and, if it is much lower, nickel will not plate evenly on the surface of the wire substrate. If nickel sulfate were not in the above electroplating bath, the nickel chloride and ferrous ammonium sulfate constituents would plate Premalloy film having a fine, laminar grain structure with characteristically high stresses induced therein. Alternatively, if nickel chloride were not in the above electrolyte, the nickel sulfate and ferrous ammonium sulfate constituents would plate a Permalloy film having a coarse, columinar grain structure with relatively lower stresses induced therein but having very poor dispersion characteristics. The combination of ferrous ammonium sulfate, nickel sulfate and nickel chloride produces a Permalloy film having a fine, equiaxial grain structure having improved dispersion characteristics, as compared to the ferrous ammonium sulfate and nickel sulfate combination, and lower internal stresses, as compared to the ferrous ammonium sulfate and nickel chloride combination. In the film produced by the ferrous ammonium sulfate, nickel sulfate and nickel chloride combination, the stresses are minimized by having the nickel sulfate constituent supply most of the nickel ions required for plating the Permalloy film and adding sufficient nickel chloride to obtain the maximum improvement in dispersion characteristics for the minimum increase in stress. By adding nickel chloride gradually to the ferrous ammonium sulfate and nickel sulfate combination, it was determined that the dispersion characteristics of the coarse, columinar grain structure did not show a signficant improvement until the nickel sulfate to nickel chloride ratio was about five to one. Further increases in nickel chloride concentration showed the dispersion characteristics improved at a decreasing rate while the resulting internal stresses of the plated Permalloy films increased sharply. At a nickel sulfate to nickel chloride ratio of four to five, there were no indications of improvement in the dispersion characteristics, but the internal stresses were quite high. Experimental test data disclosed that a nickel sulfate to nickel chloride ratio of three to one would produce the maximum improvement in dispersion characteristics for the minimum increase in internal stress. Although a nickel sulfate to nickel chloride ratio of two to one also produced acceptable test results, the ratio of three to one also produced acceptable test results, the ratio of three to one is preferred for minimizing stresses in plated films on NDRO memory wire. Therefore, for a total nickel iron concentration of 500 gm./liter, a nickel sulfate concentration of 375 gm./liter and a nickel chloride concentration of 125 gm./liter is a good starting point before adjusting the relative concentrations of these constituents to obtain optimum test results.

The temperature of the inventive electroplating bath, preferably, is maintained between 60° C. and 69° C., an optimum temperature range for plating the iron constituent of Permalloy in its ductile form. As a result, stresses in the plated Permalloy film are further minimized. However, at the aforesaid plating both temperatures, most ferrous anions tend to decompose and oxidize the associated ferrous ions. Therefore, ferrous sulfate and ferrous ions in Permalloy plating baths, because their respective complex anions do not tend to decompose as readily as other ferrous anions. In the electrolytic solution of the present invention, ferrous ammonium sulfate is preferred because its anion is more complex and therefore more stable than the sulfate anion. However, even the complex sulfate and ammonium sulfate anions tend to decompose and oxidize the associated ferrous ions, if the Permalloy plating bath is not maintained in a highly acidic condition. Therefore, Permalloy plating baths, generally, are maintained at a pH value less than three. The electroplating bath of the present invention, preferably, is maintained at a pH value between two and three to insure that the associated ferrous ions will not be oxidized. The initial concentration of iron in the inventive electrolyte, preferably, is about .02 of the total nickel concentration or 10 gm./liter. However, this iron concentration is later adjusted to obtain a plated memory wire having zero magnetostrictive characteristics. Consequently, the final concentration of iron in the inventive electrolyte may be between .02 and .01 of the nickel concentration, or between 10 and 15 gm./liter.

The speed of a magnetic plating line, usually, is determined by the slowest acting section of the line which, generally, is the on-line testing apparatus at the output end of the line. When the speed of the line has been determined, an optimum current density value can be found for plating the Permalloy film on a continuous wire moving longitudinally through the magnetic plating bath. In the electroplating bath of the present invention, a current density value of 2.5 amperes per square inch is used initially for plating Permalloy on a wire substrate moving through the bath at a speed of ten inches per minute. However, the current density is adjusted to a final value which provides the desired plating characteristics. For plating line speeds greater than ten inches per minute, a higher current density value will be required; and, conversely, for slower plating line speeds a lower current density value will be required. When the optimum current density value has been determined, saccharin is added to the inventive electroplating solution to obtain a smooth, adherent coating of Permalloy on the surface of the wire substrate. Since the total concentration of nickel sulfate and nickel chloride is maintained at about 500 grams per liter, the required amount of saccharin, generally, falls within the range of .1 to .6 gram per liter. Saccharin is a well known bath additive which functions as a leveller, brightener and stress reduced. Thus, stresses in the plated Permalloy film are reduced still further by the addition of saccharin to the inventive electrolyte. It has been found that the dispersion characteristics of the plated Permalloy coating also improve as a result of the levelling and stress reducing action of the saccharin constituent. Because the stresses have been minimized by adjusting the nickel sulfate to nickel chloride ratio to a value of about three to one, less saccharin is required in the electroplating bath of the present invention than would be required in a chloride nickel-iron bath. When plating NDRO memory wire, reducing the required concentration of saccharin in the electroplating bath is a decided advantage because of its degrading effect on the magnetic properties of NDRO memory wire. It has been noted that increasing the concentration of saccharin in an NDRO Permalloy plating bath reduces the width of the hysteresis loops corresponding in respective memory cells of the coated wire. This deleterious effect of saccharin is counteracted, in the electroplating bath of the present invention, by the cobalt constituent, because increasing the concentration of cobalt widens the hysteresis loops of the respective memory cells correspondingly. Test data discloses that the harmful effect of the saccharin constituent are fully offset by the cobalt constituent, when the concentration of cobalt is about ten times greater than the concentration of saccharin in the inventive electrolyte. Thus, in the composition table shown above, for this inventive electroplating bath, when the concentration of saccharin is about .4 gram per liter, the required concentration of cobalt is about 4 grams per liter in order to cancel the deleterious effects of saccharin on the magnetic properties of NDRO plated memory wire. Since the three to one ratio of nickel sulfate to nickel chloride minimizes stresses in the plated Permalloy film and thereby reduces the amount of saccharin required, a lower concentration of cobalt, than would be normally expected, is sufficient to offset the harmful effects of the saccharin constituent. The lower concentration of cobalt achieved by practicing this invention, is a decided advantage because too high a concentration of cobalt degrades the switching characteristics of the respective memory cells, as evidenced by the increasingly higher switching currents required to rotate the magnetic vectors of the respective cells into the hard direction.

Cobalt may be added to the inventive electrolyte in the form of any cobalt salt, such as cobalt nitrate, for example, as shown in the foregoing composition table. Preferably, the cobalt constituent is added in the form of a cobalt compound having an anion other than ammonium sulfate, sulfate, or chloride, in order to maintain separate control of the associated metal ion concentrations in the inventive electroplating bath. Thus, the nickel sulfate and nickel chloride relative concentrations may be adjusted for a three to one ratio, without upsetting the equilibria of the other metal ions with their associated anions. Similarly, after the concentration of saccharin has been adjusted to improve dispersion and reduce stresses in the plated Permalloy film, the cobalt concentration is adjusted to cancel the harmful effects of the saccharin on the magnetic properties of the resulting NDRO plated memory wire. Finally, the iron concentration is adjusted to obtain a nickel-iron-cobalt plated film having zero magnetostriction characteristics. Generally, a cobalt-Permalloy film having the percentage composition of 74 percent nickel, 19 percent iron and 7 percent cobalt exhibits zero magneto-striction characteristics. The boric acid constituent of the inventive electrolytic solution functions as a pH buffer, and the sodium lauryl sulfate constituent acts as a wetting agent, both being well known bath additives for these respective purposes.

An on-line testing apparatus, located at the output end of the magnetic plating line, tested the plated wire substrate for coercivity, anisotropy, skew and dispersion. The results of this evaluation study indicated that the electroplating bath of the present invention plates a low stressed, nickel-iron-cobalt film having zero magnetostriction and consistent magnetic properties along its length. The dispersion and switching characteristics are well within acceptable limits for plated NDRO memory wire.

Another evaluation study was performed using cobalt bromide in place of the cobalt nitrate constituent shown in the composition table for the electroplating bath of the present invention. All the other bath constituents and operating parameters remained the same as in the previous evaluation study. This second evaluation study disclosed that the presence of bromide ions in the inventive electroplating bath causes the pH value of the bath to increase. However, since only a small quantity of cobalt is required for plating NDRO memory wire, the associated small quantity of cobalt is required for plating NDRO memory wire, the associated small quantity of bromide ions did not drive the pH value of the bath above three. It was found that the bromide ions improved the dispersion characteristics and reduced stresses in the plated Permalloy film, just as the saccharin consituent did. However, the bromide ions did not degrade the magnetic properties of NDRO memory wire as saccharin characteristically does. Unfortunately, the concentration of bromide could not be increased because the pH value of the bath must be maintained below three to prevent oxidation of the ferrous ions. Since bromine and chlorine are members of the same chemical family and have similar chemical properties, one would expect the bromide ions to increase the stresses in the plated Permalloy film instead of reducing them. This result was totally unexpected and indicates that a small quantity of bromide in the electroplating bath of the present invention provides another means for reducing stresses in the plated cobalt Permalloy film.

Thus, there has been disclosed herein a novel electrolyte for an improved electroplating bath which coats a continuous wire with a low stressed film of magnetic material having consistent NDRO memory properties along the length of the wire. The combined nickel sulfate and nickel chloride constituents plate a fine, equiaxial gram structure having improved dispersion properties as compared to a conventional sulfate nickel-iron bath. Stresses are minimized in the plated film of magnetic material by deriving most of the required nickel ions from the lower stress producing nickel sulfate constituent rather than from the higher stress producing nickel chloride constituent. Since stresses are minimized, less saccharin than ordinarily would be required by a conventional chloride nickel-iron bath is sufficient to reduce stresses in the plated film of magnetic material. Because this inventive bath uses a lower concentration of saccharin, in lower concentration of cobalt material achieves the desired NDRO properties than would be expected in conventional baths of this type. With a lower concentration of cobalt in the electrolyte of the present invention, the switching characteristics of the respective memory cells in the plated cobalt-Permalloy film are greatly improved. For example, the magnetic vectors in the respective memory cells may be switched with lower value drive currents, thereby requiring less power in associated circuitry. Furthermore, cobalt may be added to the electrolyte of the present invention in the form of cobalt bromide, thus enhancing the dispersion properties of the plated magnetic film and reducing stresses therein to a minimum value.

From the foregoing, it will be apparent that various changes may be made by those skilled in the art without departing from the spirit of this invention as expressed in the appended claims. It is to be understood, therefore, that all matter described herein is to be interpreted as illustrative and not in a limiting sense.

What is claimed is:

1. An acidic aqueous electrolyte for plating nondestructive read-out memory wire having consistent magnetic properties along its length, said electrolyte comprising nickel sulfate and nickel chloride in a concentration ratio between two to one and four to one, a cobalt salt and saccharin in a concentration ratio of about ten to one and a ferrous compound having a complex anion, the total nickel concentration from both the nickel sulfate and the nickel chloride constituents being about 500 grams per liter and the total iron concentration is on the order of .02 times the total nickel concentration, the saccharin concentration being between .1 and .6 grams per liter, and the cobalt salt concentration being between 1 and 6 grams per liter.

2. An aqueous electrolyte as set forth in claim 1 wherein said nickel sulfate and nickel chloride concentration ratio is three to one.

3. An aqueous electrolyte as set forth in claim 1 wherein said cobalt salt is cobalt bromide.

4. An aqueous electrolyte as set forth in claim 1 wherein said ferrous compound is ferous ammonium sulfate.

5. An aqueous electrolyte as set forth in claim 1 wherein said electrolyte is maintained at a pH value less than three.

6. An acidic electroplating bath for coating a continuous wire cathode with a low stressed film of magnetic material having consistent NDRO memory properties, said bath comprising:

Nickel sulfate, between 300 and 500 gm./l.,
Nickel chloride, between 75 and 225 gm./l.,
Ferrous ammonium sulfate, between 10 and 15 gm./l.,
Saccharin, between .1 and .6 gm./l.,
Cobalt bromide, between 1 and 6 gm./l.,
Boric acid, between 20 and 80 gm./l.,
Sodium lauryl sulfate, between 10 and 20 mg./l.,
Water, balance,
pH, between 2 and 3;

the concentration ratio of cobalt bromide to saccharin being on the order of ten to one;
the total nickel concentration from both the nickel sulfate and the nickel chloride constituents being on the order of 500 grams per liter; and
the total iron concentration being on the order of two percent of the total nickel concentration.

References Cited

UNITED STATES PATENTS 3,533,922 10/1970 Semienko et al. ...... 204—43

GERALD L. KAPLAN, Primary Examiner

U.S. Cl. X.R.

340—174 PW

UNITED STATES PATENT OFFICE
CERTIFICATE OF CORRECTION

Patent No. 3,756,927 Dated September 4, 1973

Inventor(s) Emil Toledo

It is certified that error appears in the above-identified patent and that said Letters Patent are hereby corrected as shown below:

Column 2, lines 58-59, delete " "dispersion " and insert -- "dispersion" characteristic of a plated memory wire. If a magnetically coated wire displays poor dispersion --.

Column 3, line 53, "invention" should be -- inventive --.

Column 4, line 3, delete "a".

Column 4, line 25, "eelctroplating" should be -- electroplating --.

Column 4, line 40, "500 m./liter." should be -- 500 gm./liter.--

Column 5, line 25, "both" should be -- bath --.

Column 5, line 28, after "rous" insert -- ammonium sulfate, generally, are preferred sources of ferrous --; and "Permalloy" should be -- permalloy --.

Column 5, line 48, ".01" should be -- .04 --.

Column 5, line 75, "reduced." should be -- reducer. --.

Column 6, line 17, "responding" should be -- respondingly --.

Column 7, line 50, "in" should be -- a --.

Column 8, line 28, Claim 4, "ferous" should be -- ferrous --.

Signed and sealed this 21st day of January 1975.

(SEAL)
Attest:

McCOY M. GIBSON JR.
Attesting Officer

C. MARSHALL DANN
Commissioner of Patents

RM PO-1050 (10-69)

USCOMM-DC 60376-P69
☆ U.S. GOVERNMENT PRINTING OFFICE : 1969 O—366-334